United States Patent
Rhodes (10) Patent No.: US 6,709,616 B2
(45) Date of Patent: Mar. 23, 2004

(54) METHOD AND APPARATUS FOR CONTINUOUS INJECTION MOLDING

(75) Inventor: Richard O. Rhodes, San Francisco, CA (US)

(73) Assignee: FAFCO, Incorporated, Chico, CA (US)

( * ) Notice: Subject to any disclaimer, the term of this patent is extended or adjusted under 35 U.S.C. 154(b) by 346 days.

(21) Appl. No.: 09/851,623

(22) Filed: May 8, 2001

(65) Prior Publication Data

US 2001/0042937 A1 Nov. 22, 2001

Related U.S. Application Data (60) Provisional application No. 60/202,715, filed on May 8, 2000.

(51) Int. Cl.[7] .............................................. B29C 47/00
(52) U.S. Cl. ....................................... 264/145; 264/167
(58) Field of Search .................................. 264/145, 148, 264/161, 167; 428/99

(56) References Cited

U.S. PATENT DOCUMENTS

| | | | | |
|---|---|---|---|---|
| 3,515,778 A | * | 6/1970 | Fields et al. | 264/40.5 |
| 3,932,090 A | * | 1/1976 | Brumlik | 425/381 |
| 4,050,873 A | * | 9/1977 | Brumlik et al. | 425/371 |
| 4,084,296 A | * | 4/1978 | Moertel | 24/408 |
| 4,159,300 A | * | 6/1979 | Wise | 264/278 |
| 4,259,272 A | * | 3/1981 | MacFee | 264/445 |
| 4,323,533 A | * | 4/1982 | Bramhall | 264/145 |
| 5,596,981 A | * | 1/1997 | Soucy | 126/704 |
| 5,669,120 A | * | 9/1997 | Wessels et al. | 24/446 |
| 5,690,875 A | * | 11/1997 | Sakakibara et al. | 264/146 |
| 5,722,485 A | * | 3/1998 | Love et al. | 165/151 |
| 5,800,760 A | * | 9/1998 | Takizawa et al. | 264/167 |
| 5,938,997 A | * | 8/1999 | Sakakibara et al. | 264/167 |
| 5,948,337 A | * | 9/1999 | Sakakibara et al. | 264/167 |

* cited by examiner

*Primary Examiner*—Mark Eashoo
(74) *Attorney, Agent, or Firm*—Beyer Weaver & Thomas LLP (57) ABSTRACT

Methods and apparatus for forming continuous lengths of material with non-uniform cross-sections are disclosed. In accordance with one aspect of the present invention, a method for forming a continuous length of material that is of a substantially non-constant cross-section includes providing the material to a single shaping wheel. The material is in a first state, and the single shaping wheel includes a template that is arranged to form a three-dimensional shape using the material. The method also includes shaping the material to form an extended strip from the material, as well as at least one three-dimensional shape in the extended strip. The extended strip and the three-dimensional shape being formed using substantially only the single shaping wheel. In one embodiment, the method includes cooling the extended strip by cooling the material from a molten state to a solid state.

31 Claims, 6 Drawing Sheets

METHOD AND APPARATUS FOR CONTINUOUS INJECTION MOLDING

This application claims the benefit of provisional application No. 60/202,715 filed May 8, 2000.

BACKGROUND OF THE INVENTION

1. Field of Invention

The present invention relates generally to molding processes. More particularly, the present invention relates to a continuous injection molding process for plastic materials.

2. Description of the Related Art

The use of plastic materials is prevalent due, at least in part, to the strength, weight, and versatility of plastic materials. In order to facilitate the use of plastic materials, extrusion technology and injection molding techniques are often used to shape plastic materials. Extrusion technology is suitable for producing extended lengths of profile shapes such as hollow core shapes. That is, extrusion technology may be used to produce extended lengths or plastic material with a substantially constant cross section. Injection molding, on the other hand, is suitable for producing discrete, three-dimensional shapes.

When extended lengths of discrete three-dimensional shapes are to be produced, a strip of plastic formed using extrusion technology may essentially be "punched out," e.g., die cut, in the strip of plastic. When material is to be punched out of a strip such that three-dimensional shapes are formed in the strip, the thickness of the strip is typically constrained. Generally, the thicker the strip the higher the probability that the quality of three dimensional shapes formed in the strip will be compromised. In other words, punching out material from a strip of plastic to form three-dimensional shapes may result in the inaccurate formation of the three-dimensional shapes.

Lengths of three-dimensional shapes may also be formed using conventional injection molding techniques. When three-dimensional shapes are formed using an injection molding process, although there is typically no thickness limitation for the width and the height of the shapes, the injection molding process is generally constrained by length. The length of an injection molded strip typically may not exceed approximately several feet, due to constraints associated with injection molding equipment and the high cost of the injection mold. Specifically, the size of the equipment used in an injection molding process, as well as the cost of the process, increases as the length of a strip produced using the process increases. Hence, when injection molding is used to form a relatively long strip of three-dimensional shapes, the shorter strips must typically be assembled together to form a longer strip.

While extrusion technology is suitable for use in the formation of long strips of material, and injection molding is suitable for use in the formation of three dimensional shapes in short strips of material, neither extrusion technology nor injection molding are particularly suitable to the formation of long strips of material of substantially any thickness that contain three-dimensional shapes. Therefore, what is needed is a method for forming long strips of material with three-dimensional shapes. That is, what is desired is a method of forming strips of material that have substantially any thickness, width, and length, and are, further, of a non-constant cross-section.

SUMMARY OF THE INVENTION

The present invention relates to forming continuous lengths of material with non-uniform cross-sections. In accordance with one aspect of the present invention, a method for forming a continuous length of material that is of a substantially non-constant cross-section includes providing the material to a single shaping wheel. The material is in a first state, and the single shaping wheel includes a template that is arranged to form a three-dimensional shape using the material. The method also includes shaping the material to form an extended strip from the material, as well as at least one three-dimensional shape in the extended strip. The extended strip and the three-dimensional shape being formed using substantially only the single shaping wheel.

In one embodiment, the method includes cooling the extended strip by cooling the material from a molten state to a solid state. In such an embodiment, the method may also include removing the cooled extended strip from the single shaping wheel, and passing the cooled extended strip over a reshaping wheel to remove any curvature from the cooled extended strip.

Forming a continuous, or extended, length of material with three-dimensional shapes thereon using a method of the present invention enables the length of material to be formed with substantially any suitable thickness, e.g., a thickness of greater than approximately one-eighth of an inch. Further, the length of the material may be substantially any length. In theory, an "infinite" length of material may effectively be formed.

These and other advantages of the present invention will become apparent upon reading the following detailed descriptions and studying the various figures of the drawings.

BRIEF DESCRIPTION OF THE DRAWINGS

The present invention may best be understood by reference to the following description taken in conjunction with the accompanying drawings in which.

DETAILED DESCRIPTION OF THE EMBODIMENTS

A continuous injection molding process essentially combines continuous extrusion technology with discrete molding processes. In one embodiment, the continuous injection molding process continuously produces discrete, repeated, three-dimensional shapes interconnected with a web such that an overall "strip" that includes the web and the three-dimensional shapes has a substantially non-uniform cross section.

Although a strip with a web that interconnects discrete three-dimensional shapes may be used for a variety of different purposes, one particularly suitable purpose involves holding multiple tubes using the web and the shapes. By way of example, the strip may be used as a clip such that heat exchange tubes may be securely held between, as well as evenly spaced between, the discrete three-dimensional shapes.

Figure 1:
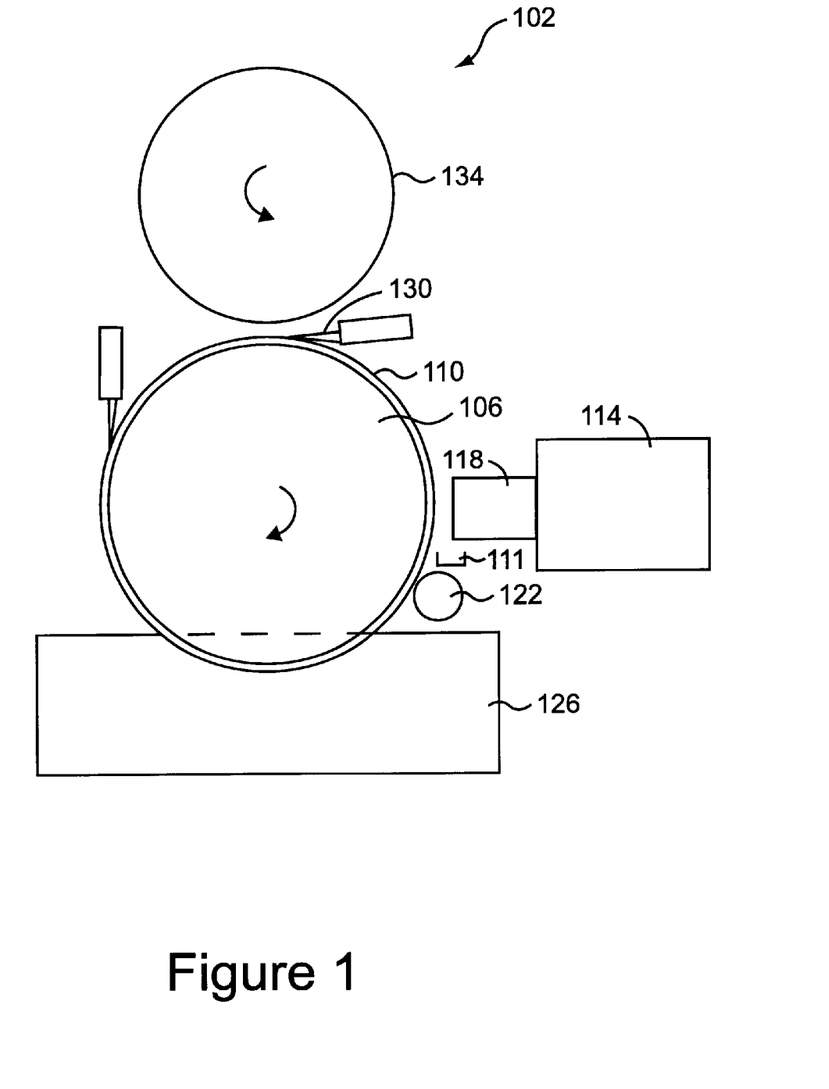
FIG. 1 is a diagrammatic representation of a continuous injection molding apparatus in accordance with an embodiment of the present invention.

FIG. 1 is a diagrammatic representation of a continuous injection molding apparatus in accordance with an embodiment of the present invention. A continuous injection molding apparatus 102 includes a shaping wheel 106 on which a curved die 110 is fitted, e.g., shrink-fitted or press-fitted. Shaping wheel 106 may be driven by a motor. Alternatively, shaping wheel 106 may be powered by a mechanism such as a puller which may cause shaping wheel 106 to rotate. A continuous injection molding process uses output, e.g., molten plastic material, from an extruder 114 that has a die 118 with an outer surface machined to fit the outer surface of curved die 110. Die 118 is not shown as fitting the outer surface of mold wheel 106, e.g., curved die 110, for ease of illustration. It should be appreciated that the outer circumference or surface of shaping wheel 106 is typically curved die 110 which has shaped indentations formed thereon using a process such as laser cutting. That is, curved die 110 may be considered to be the outer surface of shaping wheel 106. The shaped indentations are used to form molten plastic into three-dimensional shapes interconnected by a web.

Once molten plastic is outputted from die 118 and enters into indentations or cavities formed on curved die 110, the molten plastic may be flattened by a roller 122. Roller 122 is typically used to flatten the surface of the molten plastic in the cavities of curved die 110, and is not used to form three-dimensional shapes out of the molten plastic. In other words, roller 112 is essentially used to press molten plastic into the cavities, and to substantially minimize the formation of flash around the three-dimensional shapes. It should be understood that a blade (not shown) may be used, instead of or in addition to roller 112, to press molten plastic into the cavities and to substantially minimize the formation of flash. If required, a collection scooper 111 may be provided to collect excess molding material.

The molten plastic in the cavities of curved die 110 may generally be cooled using a variety of different processes. In one embodiment, cooling is performed to solidify the plastic by rotating shaping wheel 106 and, hence, curved die 110 through a cooling liquid, e.g., water, bath 126. In another embodiment, in lieu of cooling liquid bath 126, a cooling spray may be used to cause the plastic in the cavities of curved die 110 to solidify.

The solidified or at least partially solidified plastic, i.e., the molded plastic web, is ejected from the cavities of curved die 110 after cooling through either substantially directly pulling the partially solidified plastic from shaping wheel 106 using a puller, or through the use of a blade 130. Blade 130, which may be formed from a material such as brass, is generally positioned such that blade 130 substantially contacts the bottom of the cavities of curved die 110 to eject the plastic from the curved die 110.

Although efforts are made to minimize the amount of flash generated, in some circumstances, flash may be formed on the continuous strip. Accordingly, a deflashing blade 131 (or other suitable deflashing device) may be provided to deflash both sides of the continuous strip before it is removed from the shaping wheel 106. In some embodiments, a single blade can be designed to perform the functions of the removing blade 130 and the deflashing blade 131. In other embodiments, deflashing can be integrated into the flattening operation.

In general, the solidified plastic has a curvature that is a result of being formed around shaping wheel 106. When it is desired to remove the curvature, the solidified plastic may be passed over a pulley 134 which rotates in the opposite direction from shaping wheel 106. This reverse rotation of pulley 134 serves to at least partially remove the curvature from the solidified plastic.

Figure 2:
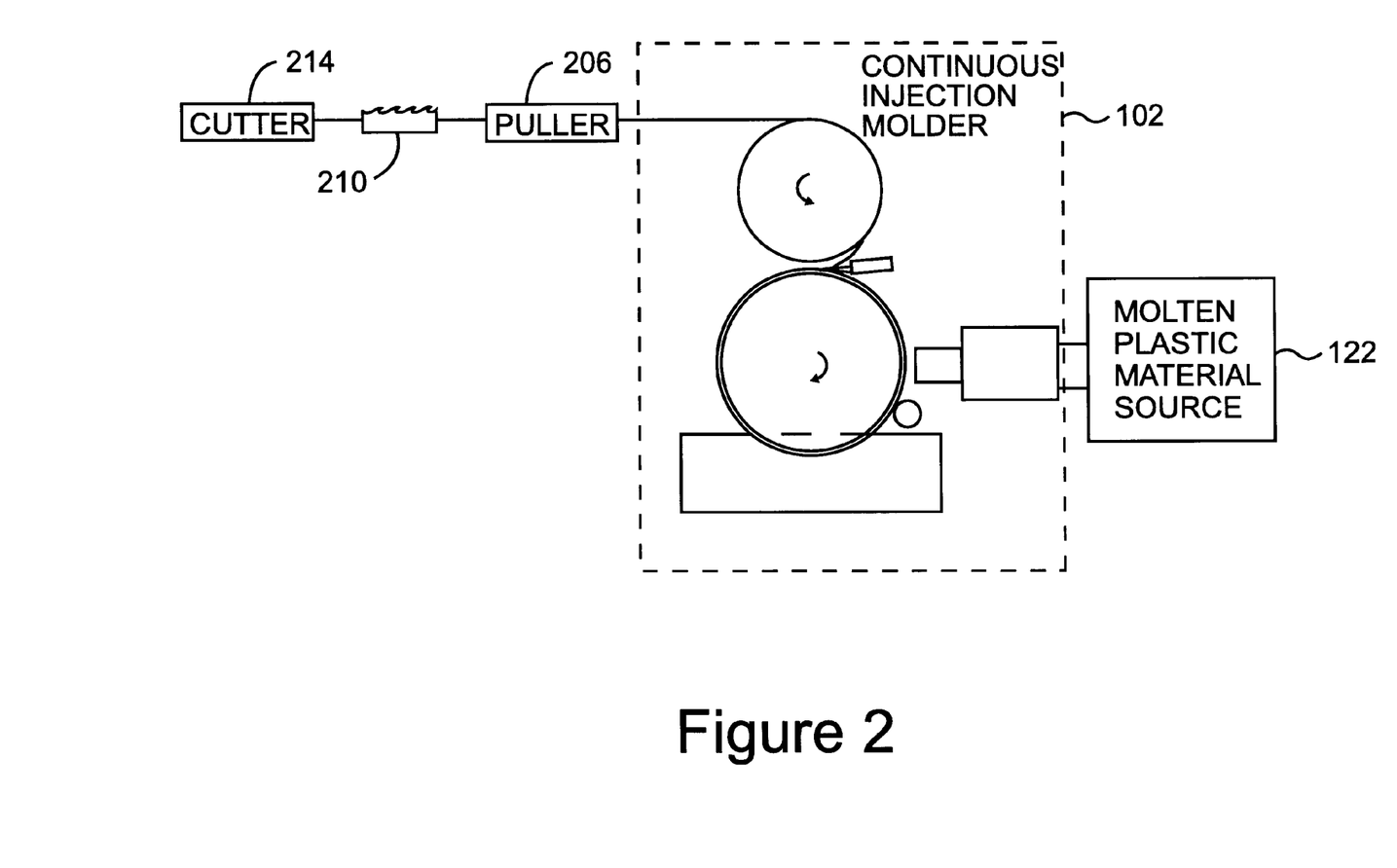
FIG. 2 is a diagrammatic representation of an overall strip production line that includes a continuous injection molding apparatus, i.e., apparatus 102 of FIG. 1, in accordance with an embodiment of the present invention.

Apparatus 102 is generally part of a production line which forms molten plastic material into strips of molded plastic. FIG. 2 is a diagrammatic representation of an overall strip production line that includes a continuous injection molding apparatus, i.e., apparatus 102 of FIG. 1, in accordance with an embodiment of the present invention. A molten plastic material source 202 may be used to feed molten plastic material to molding apparatus 102. As described above with respect to FIG. 1, molding apparatus 102 effectively outputs a web of solidified plastic. A puller 206 may be used to pull the web of solidified plastic from apparatus 102. It should be understood that puller 206, in one embodiment, may additionally serve the purpose of powering a shaping wheel of apparatus 102. In one embodiment, a cooling trough 210 may be used to further solidify the web of plastic that is produced by apparatus 102 once the web is in a substantially straightened orientation. Once the web of plastic is suitably solidified, a cutter 214 may be used to cut the web of plastic into desired lengths. Alternatively, rather that using cutter 214 to cut the web of plastic, the web of plastic may instead be coiled, e.g., using a coiling device (not shown).

It should be understood that the configuration of an overall strip production line may vary. By way of example, instead of using cutter 214 to cut the solidified web of plastic after the web is pulled by puller 206, the web of plastic may be directed substantially directly from a blade of apparatus 102, such as blade 130 of FIG. 1, to cutter 214 or a coiling device. Alternatively, a deflashing or planing device can be located between the continuous injection molder 102 and the puller.

Figure 3:
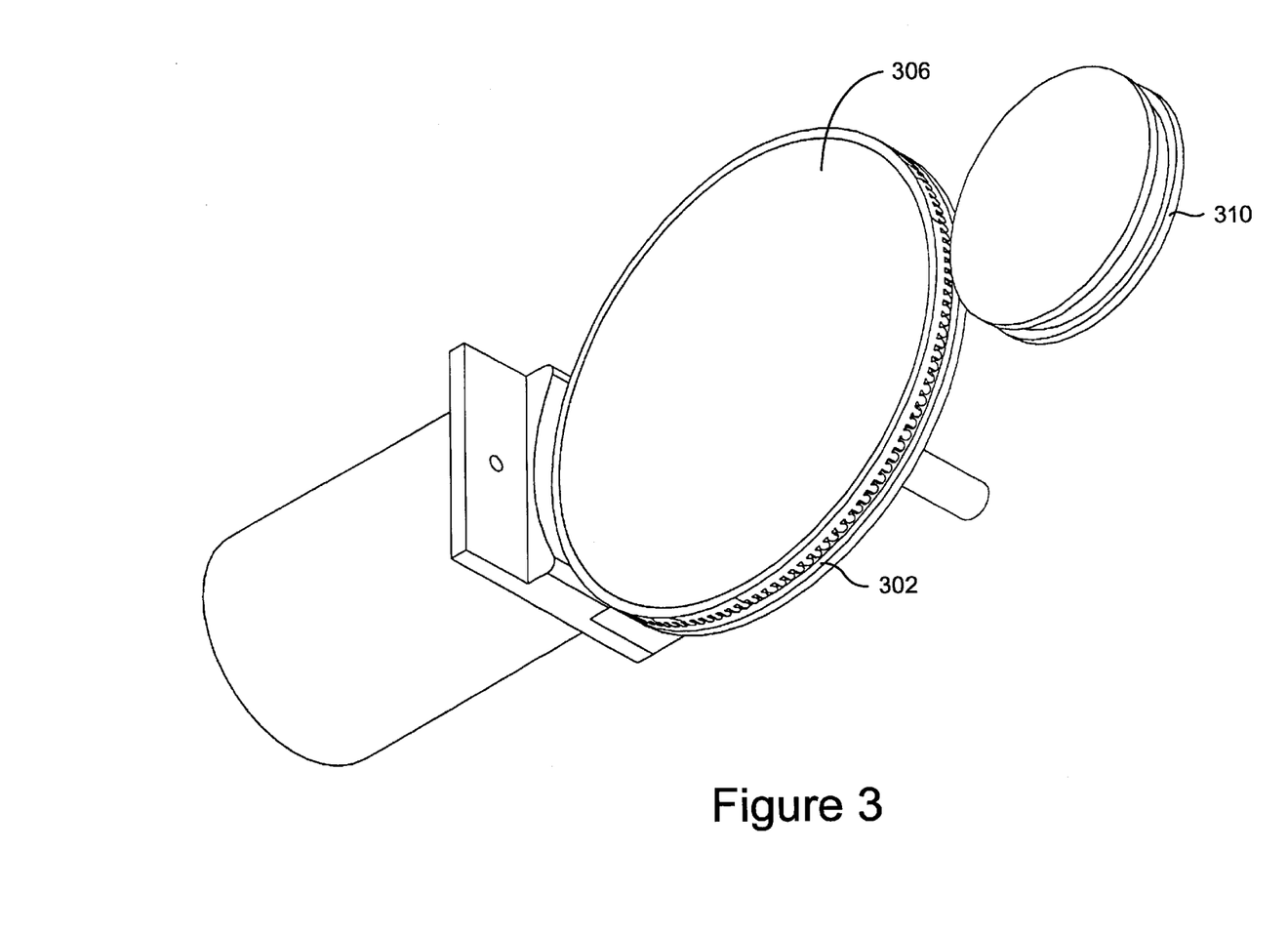
FIG. 3 is a diagrammatic representation of a shaping wheel and a shaping die in accordance with an embodiment of the present invention.

With reference to FIG. 3, the configuration of a curved die which includes cavities or indentations arranged to create a continuous injection molded web that interconnects discrete three-dimensional shapes will be described in accordance with an embodiment of the present invention. A curved die 302 is shown with respect to a shaping wheel 306 and a pulley 310. It should be appreciated that, in one embodiment, curved die 302 may be a laser cut or machined sheet of material that is welded into a hoop and shrink fit onto shaping wheel 306.

Figure 4A:
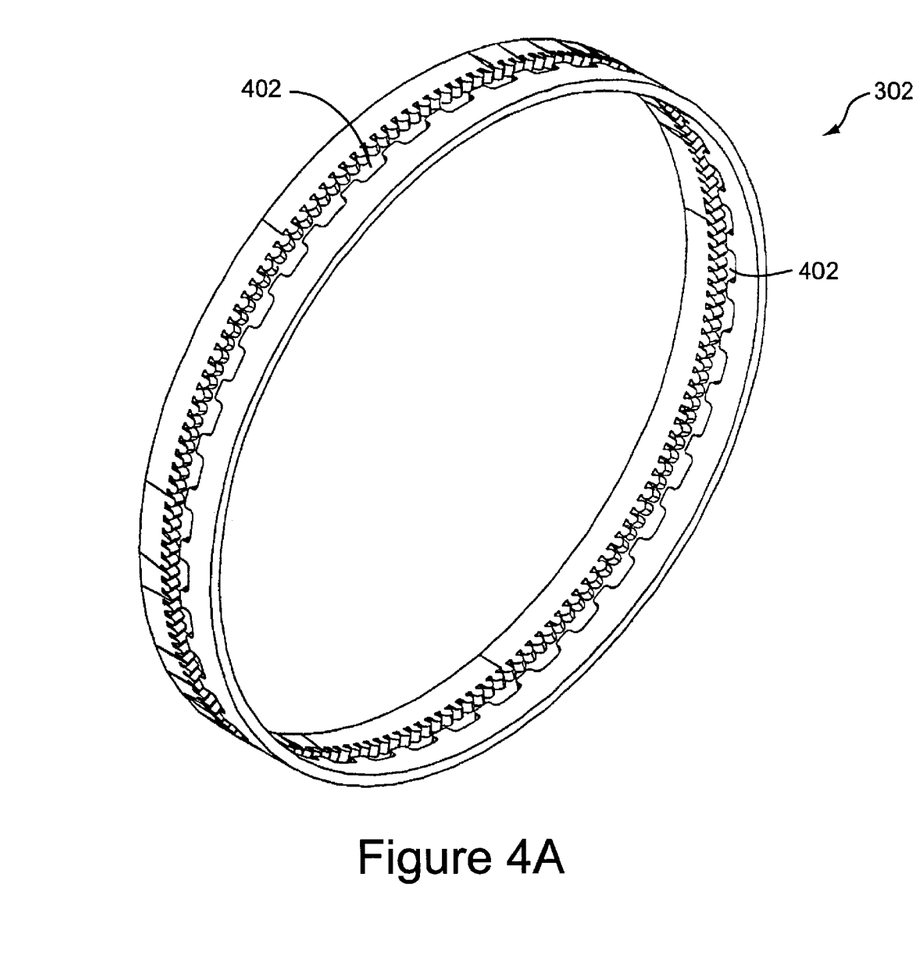
FIG. 4a is a diagrammatic representation of a shaping die, i.e., shaping die 302 of FIG. 3, in accordance with an embodiment of the present invention.

By forming curved die 302 as a hoop, as shown in FIG. 4, that is fit onto shaping wheel 306, curved die 302 may be readily changed. In other words, when the overall shape or configuration of a web that interconnects discrete three-dimensional shapes is to be changed, a new curved die may be readily formed to replace curved die 302. For example, a plate may be laser cut, formed into a hoop, fastened to shaping wheel 306, and used as a mold surface. In one embodiment, additional hoops with different mold volumes and shapes may be fastened over curved die 302 to form complex molded shapes or to produce multiple molded plastic webs simultaneously. Alternatively, additional shaping wheels with different curved dies may easily be utilized.

In the described embodiment, the molding template takes the form of curved die 302 that are mounted on the shaping wheel 302. One of the primary benefits of this approach is that permits the shape of the molded webs to be changed relatively inexpensively, (e.g., by simply creating a new die and installing the new die on either an old shaping wheel or a new shaping wheel). However, it should be appreciated that in alternative embodiments, the outer surface of the shaping wheel 306 itself may be machined to form a mold surface that acts as the molding template. That is, the outer circumference of shaping wheel 306 is cut or otherwise patterned to include the required molding features and indentations. The biggest problem with this approach is that such machining of the shaping wheel 306 is typically expensive.

Figure 4B:
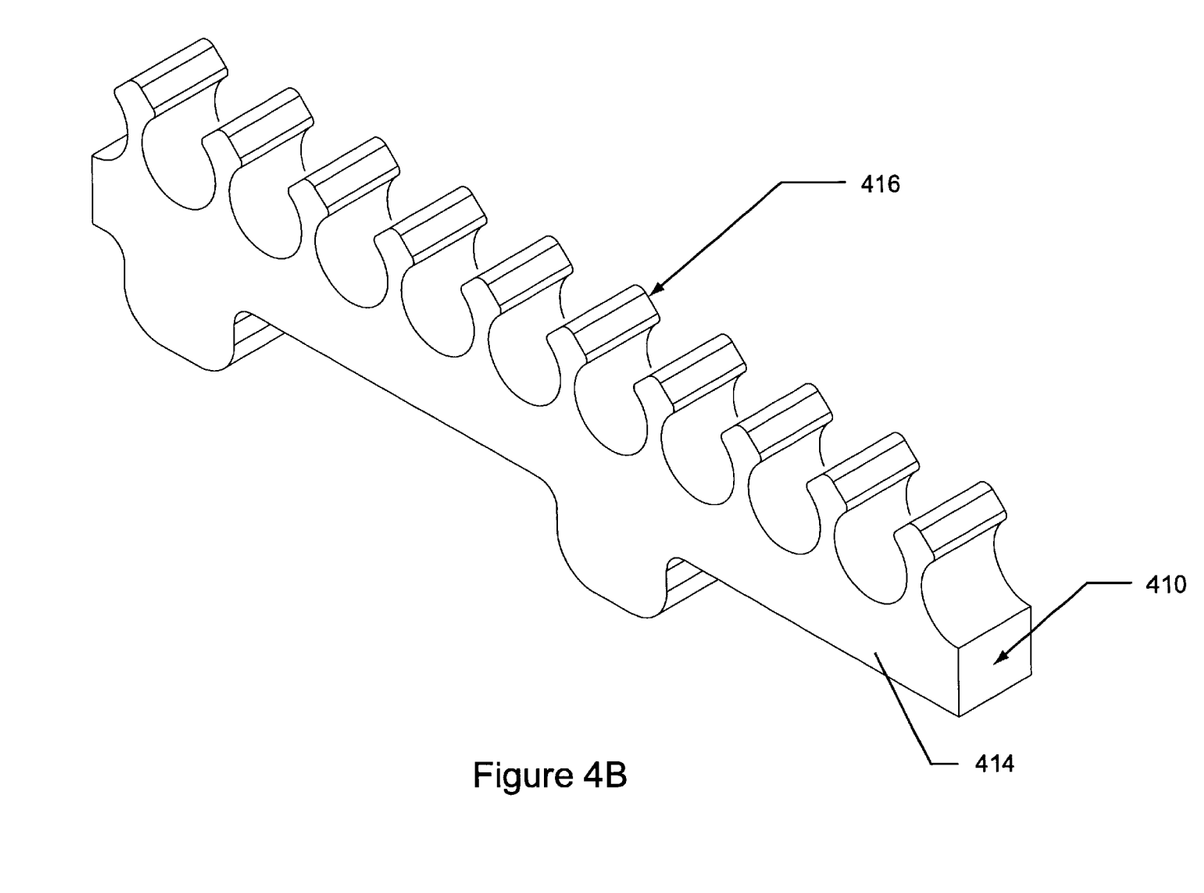
FIG. 4b is a diagrammatic representation of a section of a strip of three-dimensional shapes that are interconnected by a web in accordance with an embodiment of the present invention.

As shown in FIGS. 4a and 4b, curved die 302 is arranged to form a molten material into a strip 410 that includes a web 414 which interconnects discrete shapes 416. Hence, curved die 302 includes various cavities 402. Strip 410 is not shown to scale with respect to curved die 302, and is shown purely for purposes of illustration. Further, strip 410 is shown after a process to cut an extended length of material, as described above with respect to FIG. 2, into shorter strips. In general, due to the configuration of curved die 302, strip 410 may be of substantially any length. The length of strip 410 is not constrained by the size of curved die 302, and is, instead, substantially only constrained by the amount of available molten material.

Figure 5:
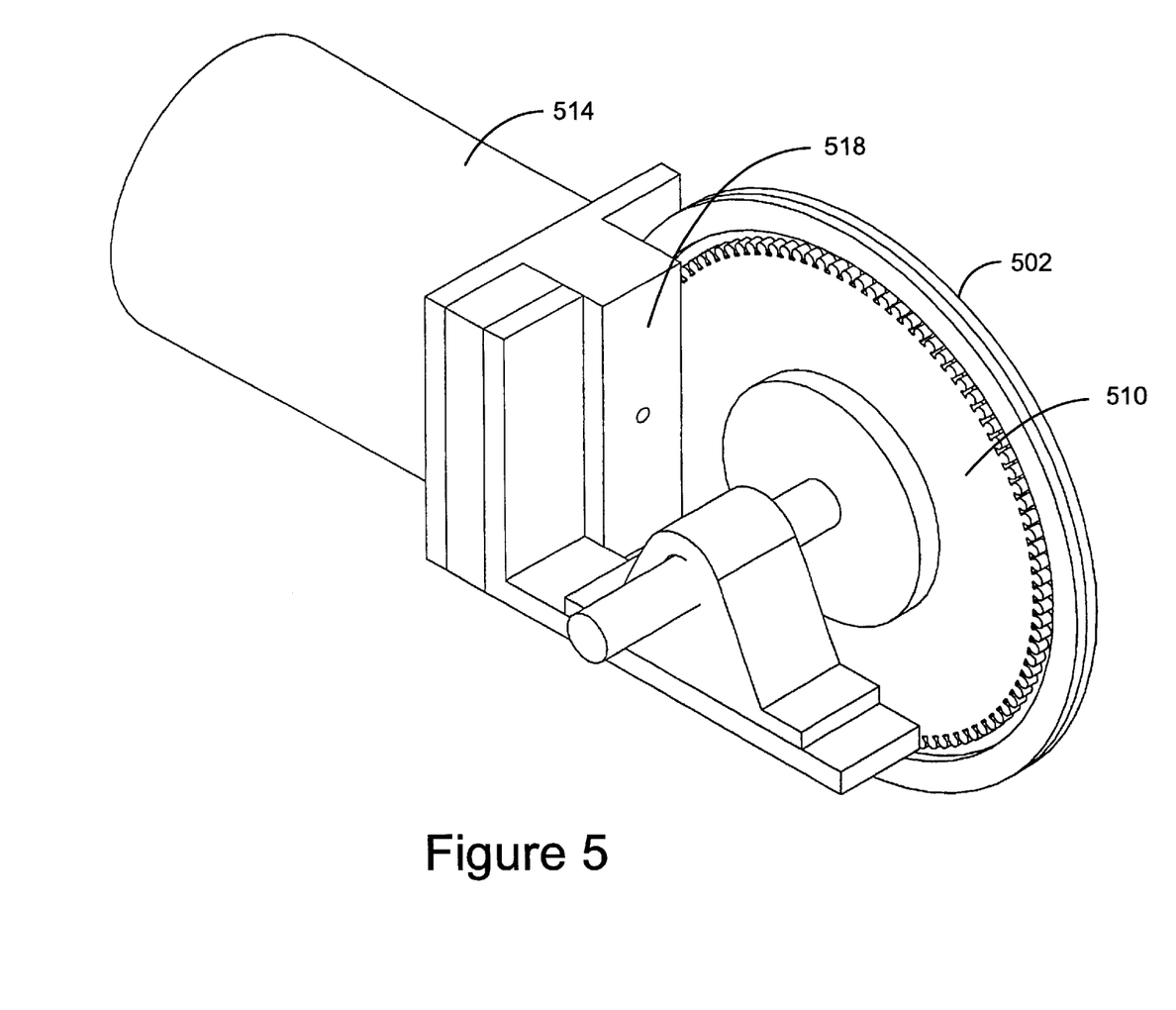
FIG. 5 is a diagrammatic representation of a shaping wheel and a shaping die in accordance with another embodiment of the present invention.

A shaping wheel has generally been described as having molding template about its outer circumference. However, the mold surface of a shaping wheel may be in a different location with respect to a shaping wheel. FIG. 5 is a diagrammatic representation of a shaping wheel and a mold, or shaping, surface in accordance with another embodiment of the present invention. A shaping surface 510 may be located at the side of a shaping wheel 502 such that molten material may be fed from an extruder 514 through an extruder die 518 that feeds onto the side of mold wheel 510. Shaping surface 510 may be formed in a disk, as shown. The use of shaping surface 510 as a disk enables shaping surface 510 to be readily replaced when a different pattern of three-dimensional shapes is to be formed.

In general, the overall sizes associated with a shaping wheel and a shaping surface, e.g., a curved die, may be widely varied depending upon the requirements of a particular application. In one embodiment particularly suited for the formation of the web illustrated in FIG. 4 which is a connector strip for holding together heat exchange tubes in plastic heat exchangers and solar heating panels, the outer diameter of a shaping surface may range from approximately 12 inches to approximately 24 inches, while the depth of the cavities in the shaping surface may be approximately one-fourth of an inch. Of course, these dimensions may be varied significantly to meet the needs of a particular application.

Although only a few embodiments of the present invention have been described, it should be understood that the present invention may be embodied in many other specific forms without departing from the spirit or the scope of the invention. By way of example, while the use of continuous injection molding has been described as being suitable for forming a substantially infinitely long web or strip of plastic which may be cut into individual strips, it should be appreciated that the continuous injection molding process may be a part of a process which forms a sheet of three-dimensional discrete shapes. That is, the infinitely long web formed by a continuous injection molding process may be cut and formed, e.g., welded together, such that the web forms a sheet that is effectively a molded array. Such a molded array may be suitable for use as a grating or a strainer.

While a material that is suitable for use in a continuous injection molded product has been described as plastic, it should be appreciated that various types of materials may be used to form a continuous injection molded product. Similarly, the materials used to form shaping wheels and curved dies, which may be formed from metal, may also be widely varied without departing from the spirit or the scope of the present invention.

It should be understood that the continuous injection molding process is suitable for forming continuously molded shapes of varying cross-sections for a variety of different applications. While the process has been described as being suitable for forming a web to hold heat exchange tubes, suitable applications are generally widely varied. By way of example, the process may be used to form a continuous belt for use with a cog and gear system. In some embodiments, it may be desirable to form different three dimensional shapes at different locations around the molding wheel. Therefore, the present examples are to be considered as illustrative and not restrictive, and the invention is not to be limited to the details given herein, but may be modified within the scope of the appended claims.

What is claimed is:

1. A method for forming an extended strip having a thickness of greater than approximately one-eighth of an inch and a non-constant cross-section, the method comprising:

providing a molten molding material to a single rotating shaping wheel that includes a molding template having features thereon suitable for forming desired features in the molding material, wherein at least a portion of said molding template comprises a die that is distinct and separate from the single rotating shaping wheel, and wherein at least a portion of the molding template is oriented about the single rotating shaping wheel such that each molding template feature comprises a substantially constant cross-section along an axis extending from the center of the rotating shaping wheel through the feature, and wherein a substantial portion of the molding template features comprise at least one side profile that is exposed, thereby forming an extended strip having a thickness of greater than approximately one-eighth of an inch and a non-constant cross section comprising discrete shapes connected to a web via interconnects having widths smaller than the widths of their respective discrete shapes;

flattening the molten material within the shaping wheel as the shaping wheel rotates; and removing the flattened extended strip having a thickness of greater than approximately one-eighth of an inch and a non-constant cross section from the shaping wheel.

2. A method as recited in claim 1, further comprising affirmatively cooling the flattened strip while the strip is on the shaping wheel, wherein the cooling transforms the molding material to a second state.

3. A method as recited in claim 2, further comprising after the removing step, passing the extended strip over a reshaping wheel arranged to substantially remove a curvature from the extended strip that is imparted by the shaping wheel thereby straightening the extended strip.

4. A method as recited in claim 3 further comprising affirmatively cooling the straightened strip.

5. A method as recited in claim 4 wherein the affirmative cooling operations each involve one of passing the strip through a trough of cooling water or spraying the strip with cooling water.

6. A method as recited in claim 1 wherein the extended strip has a thickness of greater than approximately one-fourth of an inch.

7. A method as recited in claim 1 further comprising the step of cutting the strip into lengths of greater than approximately six feet.

8. A method as recited in claim 1 further comprising the step of deflashing the extended strip while it remains on the shaping wheel.

9. A method as recited in claim 1 wherein the extended strip is formed substantially only from the molding material.

10. A method as recited in claim 1, further comprising after the removing step, passing the extended strip over a reshaping wheel arranged to substantially remove a curvature from the extended strip that is imparted by the shaping wheel thereby straightening the extended strip.

11. A method for forming an extended connector strip for holding together heat exchange tubes in plastic heat exchangers having a non-constant cross-section, the method comprising:

providing a molten molding material to a single rotating shaping wheel that includes a molding template having features thereon suitable for forming desired features in the molding material, wherein at least a portion of said molding template comprises a die that is distinct and separate from the single rotating shaping wheel;

flattening the molten material within the shaping wheel as the shaping wheel rotates; and removing the flattened extended strip having a non-constant cross section from the shaping wheel.

12. A method as recited in claim 11 wherein the extended strip has a thickness of greater than approximately one-eighth of an inch.

13. A method as recited in claim 11 wherein the features formed in the extended strip are of a size greater than approximately one-eighth of an inch.

14. A method as recited in claim 11, further comprising the step of:

fitting said die onto said single rotating shaping wheel, wherein the die is removable from the single rotating shaping wheel.

15. A method as recited in claim 11, further comprising the step of:

shrink fitting said die onto said single rotating shaping wheel, wherein the die comprises a sheet of material welded into a hoop.

16. A method as recited in claim 11 wherein a substantial portion of the molding template features comprise at least one side profile that is exposed.

17. A method as recited in claim 11 wherein the molding template is oriented about the single rotating shaping wheel such that each molding template feature comprises a substantially constant cross-section along an axis extending from the center of the rotating shaping wheel through the feature.

18. A method for forming an extended connector strip for holding together heat exchange tubes in plastic heat exchangers having discrete shapes connected to a web via interconnects having widths smaller than the widths of their respective discrete shapes, the method comprising:

providing a molten molding material to a single rotating shaping wheel that includes a molding template having features thereon suitable for forming desired features in the molding material, thereby forming an extended strip having discrete shapes connected to a web via interconnects having widths smaller than the widths of their respective discrete shapes;

flattening the molten material within the shaping wheel as the shaping wheel rotates; and removing the flattened extended strip having a non-constant cross section from the shaping wheel.

19. A method as recited in claim 18 wherein the extended strip has a thickness of greater than approximately one-eighth of an inch.

20. A method as recited in claim 18 wherein said discrete shapes are of a size greater than approximately one-eighth of an inch.

21. A method as recited in claim 18, further comprising the step of:

fitting a die onto said single rotating shaping wheel, wherein the die is distinct and separate from the single rotating shaping wheel and forms at least a portion of said molding template.

22. A method as recited in claim 18, further comprising the step of:

shrink fitting a die onto said single rotating shaping wheel, wherein the die comprises a sheet of material welded into a hoop.

23. A method as recited in claim 18 wherein the molding template is oriented about the single rotating shaping wheel such that each molding template feature comprises a substantially constant cross-section along an axis extending from the center of the rotating shaping wheel through the feature.

24. A method as recited in claim 18 wherein a substantial portion of the molding template features comprise at least one side profile that is exposed.

25. A method for forming an extended strip having a non-constant cross-section, the method comprising:

providing a molten molding material to a single rotating shaping wheel that includes a molding template having features thereon suitable for forming desired features in the molding material, wherein at least a portion of the molding template is oriented about the single rotating shaping wheel such that each molding template feature comprises a substantially constant cross-section along an axis extending from the center of the rotating shaping wheel through the feature, thereby forming an extended strip having a non-constant cross section;

flattening the molten material within the shaping wheel as the shaping wheel rotates; and removing the flattened extended strip having a non-constant cross section from the shaping wheel.

26. A method as recited in claim 25 wherein the extended strip has a thickness of greater than approximately one-eighth of an inch.

27. A method as recited in claim 25 wherein a substantial portion of the molting template features comprise at least one side profile that is exposed.

28. A method for forming an extended connector strip for holding together heat exchange tubes in plastic heat exchangers having a non-constant cross-section, the method comprising:

providing a molten molding material to a single rotating shaping wheel that includes a molding template having features thereon suitable for forming desired features in the molding material, wherein a substantial portion of the molding template features comprise at least one side profile that is exposed, thereby forming a continuous strip having a non-constant cross section;

flattening the molten material within the shaping wheel as the shaping wheel rotates; and removing the flattened extended strip having a non-constant cross section from the shaping wheel.

29. A method as recited in claim 28 wherein the extended strip has a thickness of greater than approximately one-eighth of an inch.

30. A method for forming an extended connector strip for holding together heat exchange tubes in plastic heat exchangers having a thickness of greater than approximately one-eighth of an inch and a non-constant cross-section, the method comprising:

provniding a molten molding material to a single rotating shaping wheel that includes a molding template having features thereon suitable for forming desired features in the molding material, thereby forming an extended strip having a thickness of greater than approximately one-eighth of an inch and a non-constant cross section;

flattening the molten material within the shaping wheel as the shaping wheel rotates; and removing the flattened extended strip having a thickness of greater than approximately one-eighth of an inch and a non-constant cross section from the shaping wheel.

31. A method as recited in claim 30, further including the steps of:

affirmatively cooling the flattened strip while the strip is on the shaping wheel, wherein the cooling transforms the molding material to a second state;

deflashing the extended strip while it remains on the shaping wheel;

passing the removed strip over a reshaping wheel arranged to substantially remove a curvature from the strip that is imparted by the shaping wheel thereby straightening the continuous strip; and cutting the strip into extended strips.

\* \* \* \* \*